(12) United States Patent
Shaffer et al.

(10) Patent No.: US 10,713,668 B2
(45) Date of Patent: Jul. 14, 2020

(54) METHOD AND SYSTEM FOR ADAPTIVE OUTBOUND CAMPAIGNS

(71) Applicant: Avaya Inc., Basking Ridge, NJ (US)

(72) Inventors: Shmuel Shaffer, Palo Alto, CA (US); Reinhard P. Klemm, Basking Ridge, NJ (US)

(73) Assignee: Avaya Inc., Santa Clara, CA (US)

( * ) Notice: Subject to any disclaimer, the term of this patent is extended or adjusted under 35 U.S.C. 154(b) by 548 days.

(21) Appl. No.: 13/922,528

(22) Filed: Jun. 20, 2013

(65) Prior Publication Data

US 2014/0379419 A1 Dec. 25, 2014

(51) Int. Cl.
*H04M 3/00* (2006.01)
*G06Q 30/02* (2012.01)

(52) U.S. Cl.
CPC .............................. *G06Q 30/0201* (2013.01)

(58) Field of Classification Search
CPC .... H04M 3/5158; H04M 3/51; H04M 3/5183; H04M 3/5175; G06Q 30/0201; G06Q 50/01; G06Q 30/02
USPC ..................................... 379/266.07; 705/7.29
See application file for complete search history.

(56) References Cited

U.S. PATENT DOCUMENTS

| 6,170,011 | B1* | 1/2001 | MacLeod Beck et al. ... 709/224 |
| 6,766,012 | B1* | 7/2004 | Crossley .................. 379/265.02 |
| 7,555,114 | B1* | 6/2009 | Stahr ........................ 379/265.01 |
| 2010/0023311 | A1* | 1/2010 | Subrahmanian et al. ........ 704/2 |
| 2012/0002795 | A1* | 1/2012 | Berk ...................... G06Q 30/02 379/114.01 |
| 2012/0191730 | A1* | 7/2012 | Parikh et al. ................. 707/754 |
| 2012/0323627 | A1* | 12/2012 | Herring et al. .............. 705/7.29 |

OTHER PUBLICATIONS

Article entitled "Angel Unveils New Outbound Campaign Manager"; Dec. 18, 2012; destinationCRM.com.
Yogesh Bajaj; First Office Action in India; Indian Patent Application No. 3978/MUM/2013; dated Dec. 17, 2018; Patent Office of India.

* cited by examiner

*Primary Examiner* — Rasha S Al Aubaidi
(74) *Attorney, Agent, or Firm* — Stevens & Showalter LLP

(57) ABSTRACT

A method and a system for adaptive outbound campaign are provided. The system includes a monitoring module for real-time monitoring of public sentiment to an outbound campaign. Further, the system includes an adaptive module communicably coupled to the monitoring module. The adaptive module further adapts one or more parameters corresponding to the outbound campaign based on the monitored public sentiment.

14 Claims, 3 Drawing Sheets

METHOD AND SYSTEM FOR ADAPTIVE OUTBOUND CAMPAIGNS

BACKGROUND

Field of the Invention

Embodiments of the present invention generally relate to outbound campaign and particularly to an adaptive outbound campaign based on users' responses.

Description of Related Art

Existing are some outbound products that support outbound campaigns. For example, outbound products such as Proactive Contact (PC), Proactive Outreach Manager (POM), and Avaya Notification Solution (ANS) that cover different market segments with different feature sets in the area of outbound contacts and campaigns. An example of an outbound contact or campaign is the collection of notification issued by a power utility to inform its customers about an ongoing effort to restore power after a power outage.

Outbound contact and campaign products provide tools for designing campaigns and running them until completion or until the campaign designer manually changes the campaign and restarts it. Further, such manual reconfiguration of an outbound campaign through the campaign designer is based on instinct, direct user responses such as through return emails from users in response to campaign emails, or an analysis of business metrics that may be continuously tracked and that allow for comparison either before or after the campaign.

Such manual configuration of a campaign suffers from several challenges. To begin with, relying on instinct on the part of the campaign designer means that there is a significant risk of misjudging the audience reaction. As a result, the campaign may produce undesirable or sub-optimal user reactions because the campaign designer may misjudge the reaction of the target audience. Inviting audience feedback through evaluation "forms", typically in the same communication modality as the campaign (voice, email, Web, SMS, and the like) means that users often do not or cannot disclose their true feelings about the campaign, and often has low user participation rates. Also, creating and manually collecting the results of such evaluation forms requires a substantial effort. Likewise, manually assessing user sentiment from direct user responses requires substantial effort, and the volume of such direct responses may be too low to obtain a good sense of the audience reaction to the campaign. Tracking business metrics before and during/after the campaign introduces a long latency into the campaign effectiveness evaluation. Subsequent changes to the campaign may be too late to be effective, and unrelated events may distort the measured impact of the campaign.

In conclusion, the true audience reactions may be known or understood by a campaign designer too late for a more successful reconfiguration of the campaign and thus reduces effectiveness of the campaign. Such late insight regarding true feeling of the users may slow down a required reconfiguration and thus may have a negative impact of the outbound campaign on the public and may reduce the market value of the outbound campaign accordingly. Due to the aforementioned, manual monitoring and campaign's reconfiguration can put a significant burden on the campaign designer and may further slow down any required reconfiguration.

On the other hand, users often post their thoughts on every conceivable topic, including business campaigns, on public social media and other online forums. These posts can be a highly valuable and timely source of feedback on outbound campaigns. Moreover, posts on social media can usually be correlated with characteristics of the posting user, such as age, gender, geography, language, and therefore allow deeper insights into the posted opinions than would be possible if the feedback were from anonymous users. Consequently, the outbound campaign can be fine-tuned for different demographics.

Based on the aforementioned, a system and a method are required to overcome existing challenges of outbound campaign by providing adaptive solutions for outbound campaign based on dynamic feedback to the campaign from users to enhance effectiveness of the campaign. As an example, the dynamic feedback can be retrieved from public social media and other online forums. Further, the system and the method should be able to enhance a positive impact of the outbound campaign on public and in business market. Furthermore, the system and the method should be able to reduce the burden from the campaign designer and to improve the process of reconfiguration. Thus, the outbound campaign should be effective and easily responsive in real time based on the true reactions to the outbound campaign of the users.

SUMMARY

Embodiments in accordance with the present invention provide a method for adaptive outbound campaign. The method may include monitoring, in real time, public sentiment related to an outbound campaign. Further, the method may include executing one or more rules for configuring parameters corresponding to the outbound campaign in real time. The parameters configured based on the monitored public sentiment. Embodiment monitor public sentiment through social media such as, but not limited to, social networks, public websites, forums, and emails.

In an embodiment of the present invention, on monitoring the public sentiment, the method may determine demographic information of the public (who posted comments corresponding to the outbound campaign) from the social media. Herein, the demographic information may include, but is not limited to, age, gender, language, and geography. Further, in an embodiment of the present invention, the determined demographic information may be stored in a database. Furthermore, the monitored public sentiment may be correlated with the determined demographic information related to the public. For example, if a user posts a comment that depicts negative sentiment (of the user) corresponding to the outbound campaign then based on analysis of the determined demographic information (such as 'gender'), the method of the present invention may determine a class or a type of public giving such negative sentiment. Accordingly, the outbound campaign may be fine-tuned based on the demographic information.

Embodiments in accordance with the present invention further provide a system for adaptive outbound campaign. The system may include a monitoring module for real-time monitoring of public sentiment related to an outbound campaign. Further, the system may include an adaptive module communicably coupled to the monitoring module. The adaptive module may adapt one or more parameters corresponding to the outbound campaign based on the monitored public sentiment. Herein, the adaptive module may include a rule engine to execute one or more rules for one of configuring and improving the parameters. The parameters are improved with the goal of optimizing the parameters with respect to one or more predetermined measurement criteria.

Further, embodiments of the present invention provide a server for adaptive outbound campaign in a network. The server may include a processor and a memory coupled to the processor. The memory may include one or more instructions executable by the processor to monitor one or more public sentiment related to an outbound campaign in the network. Further, the one or more instructions, executable by the processor, to adapt one or more parameters corresponding to the outbound campaign based on the monitored public sentiment. Herein, the memory may further include a database for storing one or more rules to adapt the parameters in real time based on the monitored public sentiment.

Embodiments of the present invention provide a number of advantages that may include a system and a method for adaptive outbound campaign. The system may monitor public reactions to an outbound campaign in real time, and regardless of the modality of the outbound campaign. Further, embodiments of the present invention may tap into and use customer reactions from competing businesses, which can be highly valuable in assessing the impact of an outbound campaign in the context of the competition of the business. Furthermore, embodiments of the present invention use observations of public reactions to improve campaign parameters dynamically to increase the impact of the campaign. Such dynamic improvement of the campaign parameters may reduce burden from any campaign designer who otherwise may need to bear impacts of delayed reconfiguration due to absence of true public reactions.

Moreover, due to improvement of the campaign parameters, customer satisfaction may be improved as the outbound message is tailored automatically and dynamically based on real time public sentiment. In an outbound campaign that includes live agents, the system of the present invention may tailor in real time the script used by the live agents and thus make the agents more effective. Additionally, the ability of the present invention to improve outbound campaigns and make them more impactful may increase the profitability of companies using embodiments of the present invention.

These and other advantages will be apparent from the disclosure of the present invention(s) contained herein.

The preceding is a simplified summary of the present invention to provide an understanding of some aspects of the present invention. This summary is neither an extensive nor an exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

Figure 1:
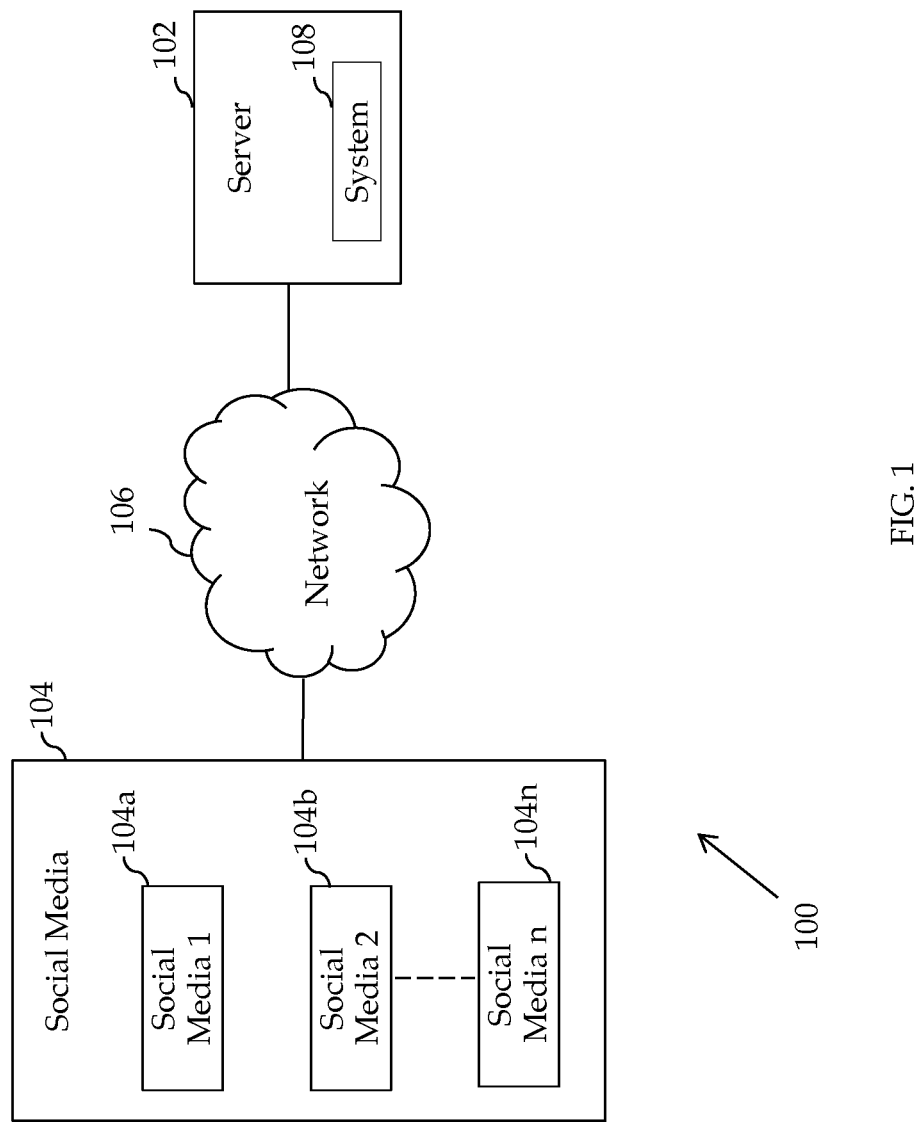
FIG. 1 illustrates an exemplary environment where various embodiments of the present invention are implemented.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The present invention will be illustrated below in conjunction with an exemplary communication system, e.g., the Avaya Aura® system. Although well suited for use with, e.g., a system having an Automatic Call Distributor (ACD) or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "server" as used herein should be understood to include a type of communications system server, as well as other types of processor-based communication control devices such as media servers, computers, adjuncts, etc.

Embodiments of the present invention may provide solution for an adaptive outbound campaign. The solution for the adaptive outbound campaign may adapt campaign parameters for improvement or configuration thereof based on real time public sentiment. For example, if the public shows negative sentiment related to any outbound campaign then embodiments of the present invention may adapt the campaign parameters to change the negative public sentiment into more positive public reaction to the outbound campaign. The outbound campaign may thus produce a positive impact to the business as measured by positive reaction of the public. For example, suppose a marketing campaign keeps customers of a company abreast of updates of products that the customers bought in the past. If customers perceive that time spent to provide information about product updates is annoyingly large compared to the time spent to address customer questions or customer support, then customers may provide such feedback on any social media instead of giving replies through same communication modality as used by the campaign. Accordingly, embodiments of the present invention may reconfigure some campaign parameters, such as reducing the frequency of providing notification, in order to give a more positive impression to the public for the campaign.

FIG. 1 illustrates an exemplary environment where various embodiments of the present invention are implemented. As shown, a server 102 may be communicably coupled to social media 104 through a network 106 and an appropriate communication interface to network 106. The social media 104 may include, but are not limited to, social networking sites, website(s) corresponding to an outbound campaign, other commercial websites, forums, and blogs, as shown through social media_1 104a, social media_2 104b and so on up to social media_n 104n. Further, the network 106 may include, but is not restricted to, a communication network such as the Internet, the PSTN, a Local Area Network (LAN), a Wide Area Network (WAN), a Metropolitan Area Network (MAN), and so forth. In an embodiment, the server 102 may gather public reactions through direct channels such as emails, SMS, calls based on the communication modality used by the outbound campaign.

The server 102 may include a system 108 for adaptive outbound campaign that may utilize public sentiment to improve or configure campaign parameters corresponding to the outbound campaign for enhancing positive impact of the outbound campaign. The campaign parameters may include one or more parameters corresponding to the outbound campaign (hereinafter may interchangeably be referred to as a "campaign") that may include, but are not limited to, frequency of notification, level of details of the notification, and managing content of the notification.

The system 108 may design an outbound campaign and may identify one or more keywords corresponding to the campaign. In an embodiment, such keywords may be utilized further to configure a social media manager for real time monitoring of public sentiment or reaction to the campaign. The public sentiment may be monitored through one or more social media 104 via the network 106. For example, the public sentiment corresponding to the campaign may be detected through any social networking website. Further, in an embodiment of the present invention, the system 108 may determine the demographic information and other characteristics of the public providing sentiment (comments) based on the outbound campaign. The demographic information (and other characteristics) may include, but is not limited to, age, gender, language and geographical information.

Further, the system 108 may establish rules that may be executed to map detected public reactions to configure parameters of the campaign. For example, a frequency of notification corresponding to the campaign may be modified based on public's reaction to the campaign and to a number of notifications to public corresponding to the campaign. In an embodiment of the present invention, the system 108 correlates the monitored public sentiment with the corresponding demographic information (and other characteristics) of the public to modify/configure the parameters of the campaign accordingly.

The system 108 may further improve the parameters to increase an impact of the campaign on the public. It may be apparent to a person skilled in the art that the term "public" may include current or past customers of an organization associated directly or indirectly to the campaign and non-customer who may be interested in products and/or services corresponding to the campaign.

The server 102 may interact with social media 104 to gather information corresponding to the campaign. The received information may be processed by the system 102 to detect public sentiment and to configure parameters associated to the campaign based on the detected sentiment. Further, in an embodiment, the server 102 may inform an organization/enterprise associated to the campaign regarding the changed or improved parameters. Furthermore, based on the improved parameters, an update or notification may be provided to the social media 104 for public viewing, or a frequency of updates and/or notifications may be reduced based on the improved parameters corresponding to the campaign.

In an embodiment, the server 102 may be utilized completely for adaptive outbound campaign in the network 106. The server 102 may include a processor (not shown) and a memory (not shown) coupled to the processor. The memory may include one or more instructions that may be executable by the processor to perform one or more functions corresponding to the campaign based on users' responses that may be captured on social media, such as the social media 104*a*, the social media 104*b*, or any other social media such as the social media 104*n*.

The instructions may be executable by the processor to identify one or more keywords corresponding to the campaign that may be utilized further to monitor one or more public sentiment corresponding to an outbound campaign in the network 106. Further, the instructions, when executed by the processor, may adapt one or more parameters corresponding to the outbound campaign based on the monitored public sentiment. In an embodiment, the server 102 may include a database (not shown) for storing one or more rules that may be utilized to adapt the parameters in real time based on the monitored public sentiment. Further, the parameters may be adapted by performing one of configuration or improvement thereof. For example, sever 102 may monitor whether the public reaction on any of the social media 104 is negative about product and/or services corresponding to the campaign. Further, if the server 102 monitors and finds that the negative public reaction is due to incorrect or incomplete information known to one or more members of the public, then based on the public reaction the server 102 may configure one or more parameters that may provide correct and/or complete details to the public regarding the product and/or services.

In another example, suppose a campaign corresponds to a political campaign leading up to an election. Further, suppose that the server 102 detects that the public is dissatisfied with actions of the political party and further the public opines that the political party spends too much time and money on canvassing instead of fulfilling its promises to take care of demands of the public. Then the server 102 may reduce frequency of notifications regarding direct canvassing for votes for the political party. Further, the server 102 may reconfigure a message to provide information regarding positive public actions performed by the political party in the past rather than engaging in negative campaigning to seek votes for the political party. Thus, in this embodiment, parameters of the campaign may be configured or improved to highlight positive image of the political party to the public.

Figure 2:
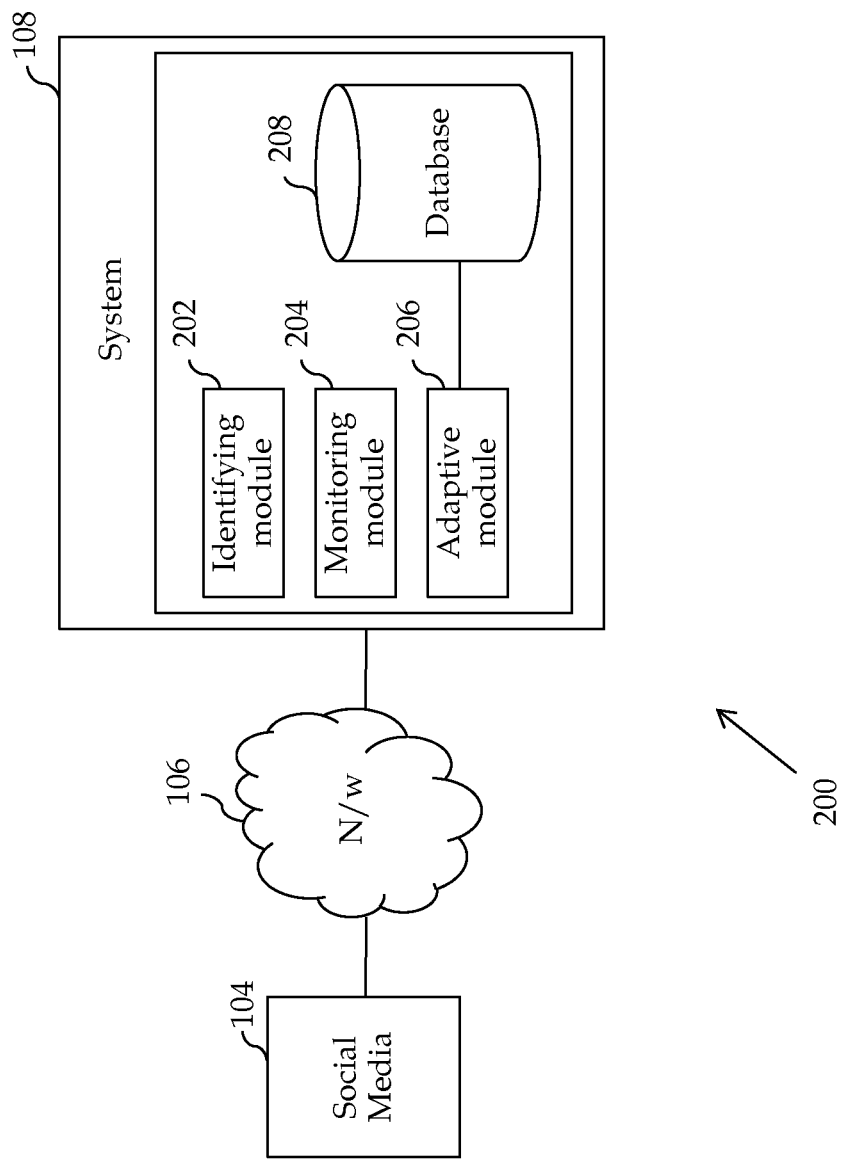
FIG. 2 depicts an exemplary block diagram of a system for adaptive outbound campaign, in accordance with an embodiment of the present invention.

FIG. 2 depicts an exemplary block diagram 200 of a system (e.g., system 108) for adaptive outbound campaign, in accordance with an embodiment of the present invention. The system 108 may be understood more clearly when read in conjunction with description of FIG. 1. As shown, the system 108 may be communicably coupled to social media 104 through a network, such as the network 106 and an appropriate communication interface to network 106. The network 106 may include, but is not restricted to, a communication network such as the Internet, the PSTN, a Local Area Network (LAN), a Wide Area Network (WAN), a Metropolitan Area Network (MAN), and so forth. The social media 104 may include, but are not limited to, various types of social networks, public forums and blogs.

The system 108 may include an identifying module 202, a monitoring module 204, an adaptive module 206 communicably coupled to the monitoring module 204 and a database 208. The identifying module 202 may identify one or more keywords corresponding to the outbound campaign. For example, if an outbound campaign corresponds to a power utility to inform its customers about an ongoing effort to restore power after a power outage then the keywords may include, but is not limited to, 'power outage', and 'power utility'. The monitoring module 204 may monitor public sentiment or reaction based on one or more identified keywords corresponding to the outbound campaign. For example, in an embodiment, the monitoring module 204 may detect if any user has commented on the outbound campaign by using such keywords. In some embodiments, monitoring module 204 may detect certain topics of interest, and responsively provide informational content, e.g., by disseminating one or more answers corresponding to a list of frequently asked questions (FAQs).

The public sentiment may be monitored through any social media or based on direct response from one or more users. The social media may include, but is not limited to, media channels (e.g., Facebook pages) of a company corresponding to the campaign, media channels related to competing businesses, social networking sites, forum, and blogs. The public sentiment may be monitored from one or more competing businesses for assessing an impact of the outbound campaign in context of the competing businesses. Further, the direct response may be received through emails, SMS, or through a voice call.

The public sentiment or reaction may be monitored in real time based on the keywords that may be identified through identifying module 202. The real-time monitoring of the public sentiment may enable the adaptive module 206 to adapt one or more parameters, corresponding to the outbound campaign, in real time. The adaptive module 206 may further be communicably coupled to the database 208. The database 208 may store one or more rules that may be utilized by the adaptive module 206 for adapting the parameters based on the monitored public sentiment. Further, the database 208 may include one or more pre-defined parameters that may be adapted, improved and/or reconfigured by the adaptive module 206. In an embodiment, the adaptive module 206 may include a rule engine (not shown) for executing the rules that may be stored in the database 208 for either configuring or improving the parameters.

For example, once the outbound campaign is launched, the monitoring module 204 may monitor social media for the reaction of the public using the keywords. Further, if the monitoring module 204 detects widespread public sentiment on the social media that a power utility is not providing power restoration updates frequently enough, the monitoring module 204 may convey this information to the adaptive module 206 that may in turn adjust the frequency or content of the notification.

Further, if the monitoring module 204 discovers that customers of competing utilities use denigrating words about the power outage and the utility's handling thereof while praising their own utility, the monitoring module 204 may convey such monitored information to the adaptive module 206. Accordingly, the adaptive module 206 may execute corresponding rules stored in the database 208 that may modify the parameters already stored in the database 208. For example, the adaptive module 206 may increase a level of detail about reasons for power outage in the outbound campaign, based on different versions with differing detail levels, such as at configuration time, that may be pre-stored in the database 208.

Further, the adaptive module 206 may increase the level of details by including a sincere sounding apology that may be stored as an option in the database 208. Furthermore, the adaptive module 206 may include a promise for a credit on the customers' next power bill, as may be pre-set in the rules stored in the database 208. Moreover, the adaptive module 206 may increase the update notification frequency corresponding to the outbound campaign.

Additionally, if the monitoring module 204 detects a public sentiment that the utility spends too much time in sending notifications about the outage rather than focusing on the restoration work itself, the adaptive module 206 may modify the parameters to slow down the frequency of the notification and may further decrease the level of detail in the notifications. Similarly, if customers praise the utility corresponding to the outbound campaign for its response, the rules may specify an omission of further apologies or promises of statement credits in the notifications. Accordingly, the adaptive module 206 may execute the rules to omit further apologies or promises of statements in the notifications.

Figure 3:
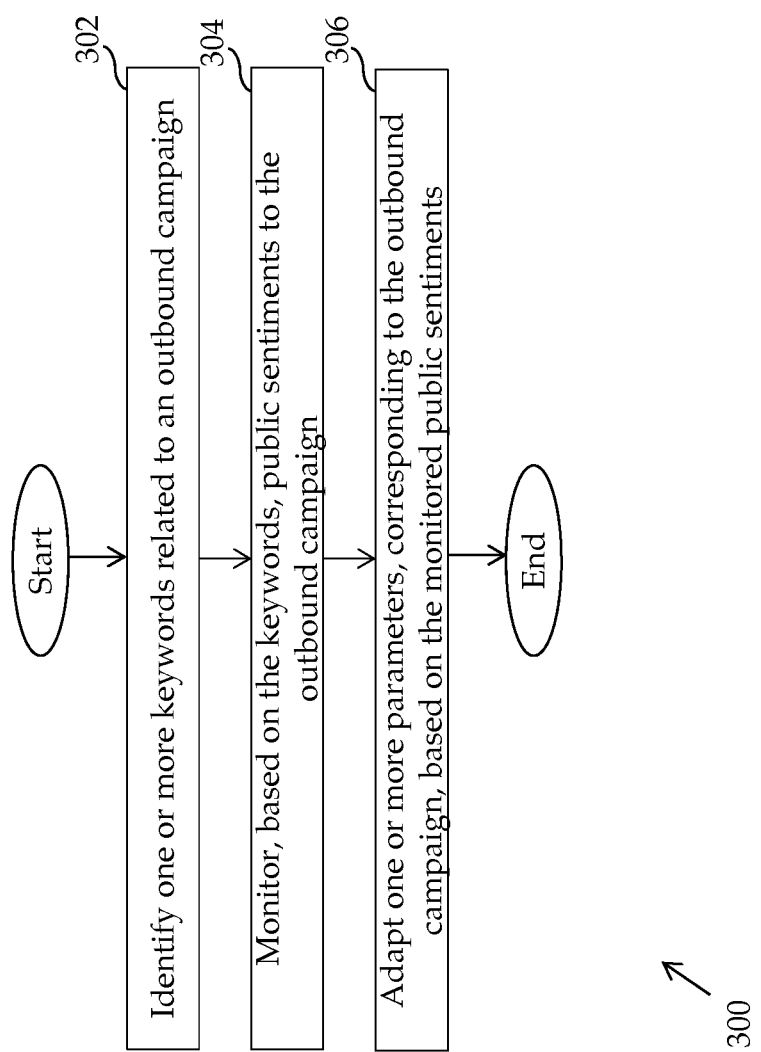
FIG. 3 illustrates a flow diagram of a method for adaptive outbound campaign, in accordance with an embodiment of the present invention.

FIG. 3 illustrates a flow diagram of a method 300 for adaptive outbound campaign, in accordance with an embodiment of the present invention. The embodiments of the method as depicted in FIG. 3 may be understood more clearly when read in conjunction with description of previous figures, such as FIG. 1 and FIG. 2. The order in which the method is performed is not intended to be construed as limitation, and further any number of the method steps may be combined in order to implement the method or an alternative method without departing from the scope of the present invention.

The method commences at 302. At step 302, the method may identify one or more keywords related to an outbound campaign. The outbound campaign may be designed for a product or a service related to, but not limited to, an organization, an enterprise, or an individual. The identified keywords corresponding to the campaign may be utilized further at step 304.

At step 304, the method 300 may monitor public sentiment to the outbound campaign based on the identified keywords. The public sentiment may be monitored from social media such as, but is not limited to, social networks, public websites, forums, emails and social media corresponding to a competing business. In an embodiment, the public sentiment may be monitored from one or more competing businesses for assessing an impact of the outbound campaign in context of the competing businesses. For example, if the outbound campaign corresponds to a marketing campaign that keeps customers of a company abreast of updates of products that the customers bought in the past then the identified keywords may include, but is not limited to, a product name, a company name, and keywords from a title of the outbound campaign. Further, the method 300 may search the social media based on the identified keywords to determine sentiment or reaction of the public corresponding to the outbound campaign.

Further, at step 306, the method 300 may adapt one or more parameters corresponding to the outbound campaign based on the monitored public sentiment. The parameters may be adapted by improvement and configuration thereof for increasing an impact of outbound campaign on the public. The parameters may include, but are not limited to, a frequency of one or more notifications corresponding to the outbound campaign, details and level of details corresponding to the notifications. Specifically, configuring and/or improving the parameters may be include but is not limited to modifying a frequency of the notifications corresponding to the outbound campaign, managing a level of details of one or more notifications, and managing content of the notifications based on the public sentiment.

For example, if an outbound campaign corresponds to notifying the public about the process of a power restoration, the method 300 may monitor, through one or more social media, phrases or keywords related to name of a power utility, the power outage, and the frequency of the notification updates corresponding to the outbound campaign. The method 300 may monitor social media for the reaction of the public using the configured keywords. If at step 304, the method 300 discovers a widespread public sentiment on social media that the power utility is not providing power restoration updates frequently enough, the method 300 may adjust the frequency of the notifications. Further, in an exemplary embodiment, the method 300 may discover that customers of competing utilities speak in a denigrating manner about the power outage and the utility's handling corresponding to the campaign while praising their own utility. In such case, the method 300 may execute corresponding pre-defined rules that may increase a level of detail about the reasons for the power outage in the outbound campaign, based on different versions with differing detail levels that may be stored by the campaign designer at a configuration time.

Furthermore, the method 300 may include a sincere-sounding apology that may be stored as an option in a database such as the database 208. It may be appreciated by a person skilled in the art that one or more parameters may be pre-stored, by a campaign designer, at a configuration time. Further, the method 300 may provide a promise for a credit on the customers' next utility bill, as may be preset by the campaign designer in the rules stored in the database. Further, the method 300 may increase the notification frequency of updates. Alternatively, if the method 300 detects a public sentiment that the utility spends too much time to notify the public about the outage rather than focusing on the restoration work, the campaign manager may slow down the frequency of the notification and decrease the level of detail in the notifications.

Additionally, if customers praise the utility for its response, the rules may specify an omission of further apologies or promises of statement credits in the notifications. The method 300 may decide to execute one or more rules from all the rules that may be stored in the database, based on the monitored public sentiment. Further, the method 300 may modify the parameters of the campaign based on the public sentiment by executing one or more corresponding rules. Further, it may be appreciated by a person skilled in the art that the public sentiment may be monitored in real time through social media and the monitored public sentiment may further be used for real time adaptation of the parameters based on the public sentiment. Due to real-time monitoring of public sentiment and adapting of the configuration parameters, the method 300 may act quickly based on the public sentiment and thereby may enhance positive impact of the outbound campaign on the public.

The order in which the method is performed is not intended to be construed as limitation, and further any number of the method steps may be combined in order to implement the method or an alternative method without departing from the scope of the present invention. It may be appreciated by a person skilled in the art that the embodiment of the method of the present invention may not be limited to the description of method FIG. 3. Further, various embodiments and steps may be implemented within the scope of the present invention. For example, the method 300 may further provide an alert to the company/organization or an individual related to the outbound campaign. For example, the method 300 may provide an update based on the monitored public sentiment and corresponding configuration or improvement that may be performed in response to the monitored public sentiment. Further, the method 300 may store updates corresponding to configuration or improvement of the parameters in a database, such as the database 208.

The exemplary systems and methods of this present invention have been described in relation to a contact center. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a Private Branch Exchange (PBX) and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for configuring an adaptive outbound campaign provided by a contact center, the method comprising:
    monitoring, by a computer of the contact center, in real time through an interface to a communication network, social media to determine public sentiment related to the adaptive outbound campaign, wherein the adaptive outbound campaign comprises one or more parameters related to how the adaptive outbound campaign is conducted; and
    based on the determined public sentiment, changing, by the computer of the contact center, at least one of the one or more parameters related to how the adaptive outbound campaign is conducted; wherein the at least one of the one or more parameters is changed while the adaptive outbound campaign is being conducted and wherein changing the at least one of the one or more parameters comprises modifying a frequency of one or more notifications provided by the adaptive outbound campaign and at least one of:
    changing a level of details of at least a first one of the one or more notifications provided by the adaptive outbound campaign, or
    changing content of at least a second one of the one or more notifications provided by the adaptive outbound campaign.

2. The method of claim 1 further comprising:
    identifying, by the computer of the contact center, one or more keywords corresponding to the adaptive outbound campaign.

3. The method of claim 2, wherein monitoring social media further comprises:
    detecting, by the computer of the contact center, occurrences of the one or more keywords in the social media.

4. The method of claim 1, wherein the social media comprises at least one of social networks, public websites, forums, or emails.

5. The method of claim 1 further comprising:
    optimizing, by the computer of the contact center, the one or more parameters related to how the adaptive outbound campaign is conducted, for increasing an impact of the adaptive outbound campaign on the public.

6. The method of claim 1, wherein monitoring social media comprises:
    determining, by the computer of the contact center, public sentiment about one or more competing businesses for assessing an impact of the adaptive outbound campaign in context of the competing businesses.

7. A system in a contact center for conducting an adaptive outbound campaign, the system comprising:
    a server of the contact center, the server comprising:
        an interface coupled to a network medium;
        a computer readable storage medium, storing executable instructions;
        a processor in communication with the computer readable storage medium, the processor when executing the executable instructions:
            monitors in real time, through the interface, social media to determine public sentiment to the adaptive outbound campaign, wherein the adaptive outbound campaign comprises one or more parameters related to how the adaptive outbound campaign is conducted; and
            changes at least one of the one or more parameters related to how the adaptive outbound campaign is conducted, based on the determined public sentiment; wherein changing the at least one of the one or more parameters comprises modifying a frequency of one or more notifications provided by the adaptive outbound campaign and at least one of:
    changing a level of details of at least a first one of the one or more notifications provided by the adaptive outbound campaign, or
    changing content of at least a second one of the one or more notifications provided by the adaptive outbound campaign.

8. The system of claim 7, wherein the processor when executing the executable instructions executes one or more rules for one of configuring or optimizing the parameters.

9. The system of claim 7 further comprising:
    a database, in communication with the server, storing one or more rules utilized by the processor for changing the at least one of the one or more parameters based on the determined public sentiment.

10. The system of claim 7, wherein the processor when executing the executable instructions identifies one or more keywords corresponding to the adaptive outbound campaign.

11. The system of claim 10, wherein the processor when executing the executable instructions detects occurrences of the one or more keywords corresponding to the adaptive outbound campaign.

12. The system of claim 7, wherein the social media comprises at least one of social networks, public websites, forums or emails.

13. The system of claim 7, wherein the processor when executing the executable instructions optimizes the one or more parameters to increase an impact of the adaptive outbound campaign on the public.

14. The system of claim 7, wherein the processor when executing the executable instructions determines public sentiment about one or more competing businesses for assessing an impact of the adaptive outbound campaign in context of the competing businesses.

* * * * *